United States Patent
Qian et al.

(10) Patent No.: US 8,497,313 B2
(45) Date of Patent: Jul. 30, 2013

(54) BIORENEWABLE THERMOPLASTIC ELASTOMERS

(75) Inventors: Guoqiang Qian, Buffalo Grove, IL (US); Krishna Venkataswamy, Crystal Lake, IL (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 13/203,535

(22) PCT Filed: Feb. 22, 2010

(86) PCT No.: PCT/US2010/024879
§ 371 (c)(1),
(2), (4) Date: Aug. 26, 2011

(87) PCT Pub. No.: WO2010/099056
PCT Pub. Date: Sep. 2, 2010

(65) Prior Publication Data
US 2011/0306711 A1    Dec. 15, 2011

Related U.S. Application Data

(60) Provisional application No. 61/155,994, filed on Feb. 27, 2009.

(51) Int. Cl.
*C08K 5/15*    (2006.01)

(52) U.S. Cl.
USPC .......................................... 523/124; 524/114

(58) Field of Classification Search
USPC .......................................... 523/124; 524/114
See application file for complete search history.

(56) References Cited

U.S. PATENT DOCUMENTS

| | | | |
|---|---|---|---|
| 4,374,225 A | 2/1983 | Kawakubo et al. | |
| 5,543,489 A | 8/1996 | Alex et al. | |
| 5,922,832 A | 7/1999 | Randall et al. | |
| 6,361,730 B1 | 3/2002 | Alex et al. | |
| 7,196,124 B2 | 3/2007 | Parker et al. | |
| 7,718,740 B2 | 5/2010 | Malet et al. | |
| 7,968,655 B2 | 6/2011 | Malet | |
| 2006/0121170 A1 | 6/2006 | Howard | |
| 2007/0270239 A1* | 11/2007 | Sullivan et al. | 473/354 |
| 2009/0176924 A1 | 7/2009 | Bordere et al. | |
| 2010/0227967 A1 | 9/2010 | Page et al. | |
| 2013/0005901 A1 | 1/2013 | Qian et al. | |

FOREIGN PATENT DOCUMENTS

| JP | 2000034403 A | 2/2000 |
|---|---|---|
| JP | 2001192553 A | 7/2001 |

OTHER PUBLICATIONS

Espacenet Abstract for JP2000034403 (2000).
Espacenet Abstract for JP2001192553 (2001).

* cited by examiner

*Primary Examiner* — Kriellion Sanders
(74) *Attorney, Agent, or Firm* — John H. Hornickel

(57) ABSTRACT

A thermoplastic elastomer compound is disclosed having polyether-polyamide copolymer, epoxidized soybean oil, and vulcanized vegetable oil. The compound has a biorenewable content of the compound of at least about 70 weight percent. The compound can be used to make a plastic article needing a Shore A hardness of from about 22 to about 72. The compound is a sustainable solution for extruded or molded articles.

12 Claims, No Drawings

BIORENEWABLE THERMOPLASTIC ELASTOMERS

CLAIM OF PRIORITY

This application claims priority from U.S. Provisional Patent Application Ser. No. 61/155,994 and filed on Feb. 27, 2009, which is incorporated by reference.

FIELD OF THE INVENTION

This invention relates to thermoplastic elastomers, polymer compounds which exhibit elasticity while remaining thermoplastic, which are predominantly made of biorenewable materials.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers (TPEs) combine the benefits of elastomeric properties of thermoset polymers, such as vulcanized rubber, with the processing properties of thermoplastic polymers.

Thermoplastic elastomers presently are prepared from fossil-fuel derived polymer resins, such as styrene block copolymers (SBCs), thermoplastic vulcanizates (TPV), thermoplastic olefins (TPO), copolyesters (COPE), thermoplastic urethanes (TPU), copolyamide (COPA), and most recently olefin block copolymers (OBCs).

SUMMARY OF THE INVENTION

The art needs a TPE made from biorenewable materials. However, it is not straightforward to find appropriate biorenewable materials which can be combined to form a biorenewable TPE which functions physically in a comparable manner to a fossil-fuel derived TPE.

The present invention has found a unique combination of three different biorenewable materials can form a biorenewable TPE which has commercially acceptable physical performance properties.

More specifically, beginning with a polyether/polyamide copolymer ("copolyamide" or COPA), one can prepare a biorenewable TPE which can have a hardness ranging from about 22 to about 72 on the Shore A hardness scale.

This biorenewable TPE is achieved by combining with the COPA an epoxidized soybean oil (ESO) and a vulcanized vegetable oil (VVO).

Significantly, it has been found that both types of oil are required. A combination of only epoxidized soybean oil with COPA yields a totally unacceptable oil-bleeding TPE. A combination of only vulcanized vegetable oil with COPA yields a totally unacceptable very hard TPE well above the desired Shore A hardness range described above.

Unexpectedly, it has been found that the vulcanized vegetable oil, though a solid powder, contributes to the stability of the biorenewable TPE, minimizing bleeding of epoxidized soybean oil from the TPE while also not making the TPE too hard for commercially acceptable uses. The solid VVO literally stops the ESO bleeding from the COPA without blocking the performance of the ESO to reduce the hardness of the COPA.

The present invention solves the problem of finding a commercially practical biorenewable TPE which can be used in replacement of a conventional TPE prepared from ingredients, particularly polymers, which are derived synthetically from fossil fuels such as petroleum or natural gas.

One aspect of the invention is a thermoplastic elastomer compound, comprising (a) from about 10 to about 60 weight percent of a polyether-polyamide copolymer; (b) from about 10 to about 40 weight percent of epoxidized soybean oil; and (c) from about 20 to about 60 weight percent of a vulcanized vegetable oil, wherein the biorenewable content of the compound is at least about 70 weight percent.

"Biorenewable content" for this invention means that the source of the ingredient is a current naturally occurring substance. As such, the biorenewable TPE of the present invention is a compound contributing to the sustainability of natural resources available on earth, rather than derived from within the earth. Desirably, the biorenewable content exceeds 75%. Preferably, the biorenewable content can exceed 80% or even 85%.

The epoxidized soybean oil and the vulcanized vegetable oil are both fully biorenewable. The amide comonomer of the COPA is biorenewable. In the TPE compound of the present invention, only the ether comonomer is not biorenewable.

Another aspect of the invention is a plastic article molded or extruded from the biorenewable TPE of the present invention.

Features of the invention will become apparent with reference to the following embodiments.

EMBODIMENTS OF THE INVENTION

Copolyamide

The copolyamide useful in the present invention is a polyether-polyamide made specifically with an amide comonomer from biorenewable sources.

Arkema, Inc. sells branded Pebax Rnew polyether-polyamide copolymer. Of the several grades available of the Pebax Rnew COPA, 25R53 (SA01 or SP01), 40R53 (SA01 or SP01), 55R53 (SA01 or SP01), 63R53 (SA01 or SP01), 70R53 (SA01 or SP01) or 72R53 (SA01 or SP01) can be used, with the softer grades such as 25R53 (SA 01 or SP 01) and 40R53 (SA 01 or SP 01) being presently preferred because they are more elastic compared with the harder grades. Also, they have been found to be quite compatible with both epoxidized soybean oil and vulcanized vegetable oil.

The various preferred grades of Pebax Rnew COPA have melting points ranging from 136° C.-148° C., Hardnesses ranging from 26-42 on the Shore D scale instantaneously and 22-39 on the Shore D scale after 15 seconds, Stresses at Break of 34-45 MPa, Strains at Break of >600% to >750%, and Tensile Moduli of 15-70 MPa.

The COPA alone is too hard for commercially acceptance, especially in substitution of a conventional TPE made from a fossil-fuel polymer resin. It needs to be softened.

Epoxidized Soybean Oil

Any epoxidized soybean oil (CAS No. 8013-07-8) is a candidate for use in the present invention. The ESO is used to provide plasticization of the COPA, making it less hard and suitable for use as a TPE with a hardness of commercial acceptance.

Commercially available ESOs include several Paraplex brand epoxidized soybean oil grades from Hallstar. Of the available grades, Paraplex G-62 ESO is presently preferred because of its high molecular weight, low acid value, low color and low iodine number. It also has good compatibility with polar polymers. It is a viscous light yellow liquid with a mild odor.

The addition of ESO to COPA has been found to reduce the Shore A hardness to a commercially acceptable range, but the ESO can not be contained in the resulting extruded pellets or molded articles, resulting in totally unacceptable bleeding of oil, also known as blooming. Without the addition of VVO, a commercially acceptable biorenewable COPA-ESO TPE is not practical.

Vulcanized Vegetable Oil

Any vulcanized vegetable oil is a candidate for use in the present invention. The VVO has been found to be unexpectedly vital to stabilize the ESO in the COPA to minimize oil bleeding but does not adversely affect other physical properties of the TPE such as Shore A hardness.

Commercially available VVOs include several Akrofax brand vulcanized vegetable oil grades from Akrochem. Of the available grades, Akrofax 758 VVO is presently preferred because it is sulfurless and provides good color stability during compounding.

Akrofax 758 is an oil resistant grade vulcanized vegetable oil. It was originally designed for millable urethanes and fluorocarbons, HNBR and other peroxide cured rubber compounds. It has been used to provide a unique surface finish and supple feel to vulcanized rubber goods. Even though it is vulcanized, it has the ability to flow under mechanical pressure, and therefore, it is useful in thermoplastic compounding. While the mechanism to minimize oil bleeding provided by VVO is not known, without being limited to a particular theory, it is believed that, as reported by its manufacturer, the ability of VVO to absorb large amounts of mineral oil and other liquid plasticizer provides the resistance to oil bleeding needed in the TPEs of the present invention. The capacity to absorb oil reduces the migration of oils and plasticizers to the surface of plastic parts. The absorption of ESO by VVO, however, does not adversely affect the hardness of the COPA-ESO-VVO TPE. That is unexpected.

Optional Additives

The thermoplastic elastomer compounds of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; antioxidants; biocides (antibacterials, fungicides, and mildewcides), anti-fogging agents; anti-static agents; bonding, blowing and foaming agents; dispersants; fillers and extenders; smoke suppressants; expandable char formers; impact modifiers; initiators; lubricants; micas; pigments, colorants and dyes; plasticizers; processing aids; other polymers; release agents; silanes, titanates and zirconates; slip and anti-blocking agents; stabilizers; stearates; ultraviolet light absorbers; viscosity regulators; waxes; and combinations of them.

Table 1 shows the acceptable, desirable, and preferable ranges of ingredients for the thermoplastic elastomer compound of the present invention.

TABLE 1

Ranges of Ingredients

| Ingredient (Wt. Percent) | Acceptable | Desirable | Preferable |
|---|---|---|---|
| Copolyamide | 10-60% | 15-55% | 20-50% |
| Epoxidized Soybean Oil | 10-40% | 15-35% | 18-30% |
| Vulcanized Vegetable Oil | 20-60% | 25-55% | 30-50% |
| Other Additives | 0-20% | 0-10% | 0-5% |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 300 to about 700 revolutions per minute (rpm), and preferably from about 500 rpm. Typically, the output from the extruder is pelletized for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Any plastic article currently made from a conventional TPE compound made using fossil-fuel derived polymers and other ingredients can now be made using a sustainable biorenewable TPE of the present invention.

In any regulatory or market regime which demands predominantly biorenewable content, the TPE compounds of the present invention can serve in an unexpectedly superior fashion with biorenewable content exceeding 70% without (a) loss of desired Shore A hardness, (b) loss of other physical properties necessary for a TPE and (c) unacceptable bleeding of ESO from the plastic article, whether extruded or molded.

As sources of fossil-fuel polymers become more expensive or scarce or less desired for reasons of sustainability, the biorenewable compound of the present invention can become the best option for makers of plastic articles and their customers.

EXAMPLES

Table 2 shows sources of ingredients for the examples. It must be noted that no attempt was made to combine only COPA with VVO because the solid powder VVO would not reduce the Shore A Hardness of the COPA. It must also be noted that no physical properties were measured for Comparative Examples A-E because the ESO was bleeding severely from the extruded pellets resulting from the compounding process.

All ingredients for each Example and each Comparison Example were fed into the throat of a Leistritz twin screw extruder having a mixing speed of 500 rpm and a temperature of 182° C. in Zone 1, 193° C. in Zone 2, 204° C. in Zone 3, 204° C. in Zone 4, 204° C. in Zone 5, 204° C. in Zone 6, 204° C. in Zone 7, 204° C. in Zone 8, and 193° C. Die. After compounding, pellets were formed and molded into 5"×6"×0.125" (12.7 cm×15.24 cm×0.32 cm) plaques for Shore A Hardness and other physical performance testing.

Table 2 shows the formulations, test methods employed and the results obtained.

TABLE 2

| Ingredients and Test Results | 1 | A | 2 | B | 3 | C | 4 | D | 5 | E |
|---|---|---|---|---|---|---|---|---|---|---|
| *Ingredients (Weight Percent)* | | | | | | | | | | |
| Akrofax 758 Vulcanized Vegetable Oil (Akrochem, Akron, OH) | 47.45 | 0.00 | 47.45 | 0.00 | 42.42 | 0.00 | 36.93 | 0.00 | 31.67 | 0.00 |
| Paraplex G-62 Epoxidized Soybean Oil (Hallstar, Chicago, IL) | 28.47 | 54.35 | 28.47 | 54.35 | 25.45 | 44.30 | 22.16 | 35.20 | 19.00 | 27.84 |
| Pebax Rnew 25R53 SP 01 Copolyamide (Arkema, Philadelphia, PA) | 23.72 | 45.29 | 0.00 | 0.00 | 0.00 | 0.00 | 0.00 | 0.00 | 0.00 | 0.00 |
| Pebax Rnew 40R53 SP 01 Copolyamide (Arkema, Philadelphia, PA) | 0.00 | 0.00 | 23.72 | 45.29 | 31.81 | 55.37 | 40.63 | 64.54 | 49.09 | 71.92 |
| Irganox 1010 antioxidant (Ciba, Terrytown, NY) | 0.12 | 0.12 | 0.12 | 0.12 | 0.11 | 0.11 | 0.09 | 0.09 | 0.08 | 0.08 |
| Kemamide E Ecrucamide lubricant (PMC Group, Mount Laurel, NJ) | 0.24 | 0.24 | 0.24 | 0.24 | 0.21 | 0.22 | 0.18 | 0.18 | 0.16 | 0.16 |
| Total | 100.00 | 100.00 | 100.00 | 100.00 | 100.00 | 100.00 | 100.00 | 100.00 | 100.00 | 100.00 |
| Bio Renewable Content | 81.% | 64% | 87% | 75% | 82% | 69% | 77.00% | 64% | 73.00% | 60% |
| Form of Product After Mixing | Pellets | Pellets Bleeding Oil | Pellets | Pellets Bleeding Oil | Pellets | Pellets Bleeding Oil | Pellets | Pellets Bleeding Oil | Pellets | Pellets Bleeding Oil |
| *Test Results* | | | | | | | | | | |
| Hardness Shore A Scale (ASTM ASTM D2240, 10 s delay) | 22 | Not Possible | 44 | Not Possible | 56 | Not Possible | 65 | Not Possible | 72 | Not Possible |
| 100% Modulus (ASTM ASTM D412, Die C) | 94.5 | Not Possible | 228 | Not Possible | 329 | Not Possible | 398 | Not Possible | 485 | Not Possible |
| Tensile Strength (ASTM ASTM D412, Die C) | 227 | Not Possible | 373 | Not Possible | 625 | Not Possible | 881 | Not Possible | 1116 | Not Possible |
| Tensile Elongation (ASTM ASTM D412, Die C) | 302 | Not Possible | 225 | Not Possible | 305 | Not Possible | 379 | Not Possible | 438 | Not Possible |
| Viscosity at 67023/s (ASTM D3835, 200° C.) | 2.7 | Not Possible | 3.7 | Not Possible | 4.8 | Not Possible | 5.4 | Not Possible | 6.1 | Not Possible |
| Viscosity at 11170/s (ASTM D3835, 200° C.) | 8.9 | Not Possible | 12.4 | Not Possible | 16.6 | Not Possible | 18.6 | Not Possible | 21.1 | Not Possible |
| Viscosity at 1340.5/s (ASTM D3835, 200° C.) | 27 | Not Possible | 44.7 | Not Possible | 60.8 | Not Possible | 66.6 | Not Possible | 72.4 | Not Possible |
| Viscosity at 223/s (ASTM D3835, 200° C.) | 61.3 | Not Possible | 114 | Not Possible | 149 | Not Possible | 144 | Not Possible | 146 | Not Possible |

TABLE 2-continued

| Ingredients and Test Results | | | | | | | | | | |
|---|---|---|---|---|---|---|---|---|---|---|
| | 1 | A | 2 | B | 3 | C | 4 | D | 5 | E |
| Viscosity at 67.023/s (ASTM D3835, 200° C.) | 81.1 | Not Possible | 224 | Not Possible | 250 | Not Possible | 214 | Not Possible | 210 | Not Possible |

Examples 1-5 demonstrate a Shore A hardness ranging from 22 to 72 with a biorenewable content ranging from 73 to 87 percent. The presence of the VVO in the biorenewable TPE in Examples 1-5 made it possible to avoid bleeding of ESO from the pellets and the molded testing samples.

It was unexpected to be able to plasticize the biorenewable TPE to commercially acceptable Shore A hardness levels without bleeding of ESO from the TPE, because of the presence of VVO to stabilize the TPE. The amount of VVO, even in excess of the amount of ESO at a weight ratio of 1.66:1.0, did not adversely affect Shore A hardness.

The invention is not limited to the above embodiments. The claims follow.

What is claimed is:

1. A thermoplastic elastomer compound, comprising:
   (a) from about 10 to about 60 weight percent of a polyether-polyamide copolymer;
   (b) from about 10 to about 40 weight percent of epoxidized soybean oil; and
   (c) from about 20 to about 60 weight percent of a vulcanized vegetable oil.

2. The compound of claim 1, wherein the compound comprises from about 15 to about 55 weight percent of the copolymer, from about 15 to about 35 weight percent of the epoxidized soybean oil, and from 25 to about 55 weight percent of the vulcanized vegetable oil.

3. The compound of claim 1, wherein the compound comprises from about 20 to about 50 weight percent of the copolymer, from about 18 to about 30 weight percent of the epoxidized soybean oil, and from 30 to about 50 weight percent of the vulcanized vegetable oil.

4. The compound of claim 1, wherein the compound has a Shore A hardness ranging from about 22 to about 72.

5. A plastic article made from a compound of claim 1.

6. The compound of claim 2, wherein the compound has a Shore A hardness ranging from about 22 to about 72.

7. The compound of claim 3, wherein the compound has a Shore A hardness ranging from about 22 to about 72.

8. A plastic article made from a compound of claim 2.

9. A plastic article made from a compound of claim 3.

10. The plastic article of claim 5, wherein the compound has a Shore A hardness ranging from about 22 to about 72.

11. The plastic article of claim 8, wherein the compound has a Shore A hardness ranging from about 22 to about 72.

12. The plastic article of claim 9, wherein the compound has a Shore A hardness ranging from about 22 to about 72.

* * * * *